ns
3,126,283
SWEETENED CONDENSED PRODUCT
Peter P. Noznick, Robert H. Bundus, and Ingmar B. Eggen, Chicago, Ill., assignors to Beatrice Foods Co., Chicago, Ill., a corporation of Delaware
No Drawing. Filed Dec. 5, 1962, Ser. No. 242,369
19 Claims. (Cl. 99—55)

This invention relates to a recombined, sweetened condensed milk product and a method of preparing same, which is made from dry ingredients other than water.

In carrying out the invention, skim milk powder is initially reconstituted with water at room temperature to which is added, after heating, sugar and a fat, e.g., vegetable and animal fats and mixtures thereof. The aforesaid mix is thereafter treated to reduce the size of the fat particles, then sterilized without objectionably increasing viscosity, flash-cooled to about 90° F. in a vacuum pan, and thereafter seeded with lactose. The product is then cooled to about room temperature, e.g., about 70° F., and filled into cans under aseptic conditions so as to be free of yeast and mold contaminations.

The primary object of this invention is to provide a method of recombining the initially dry ingredients and water into a sweetened condensed milk product containing, for example, about 72–73% total solids, about a 60–61% (polysaccharide) sugar-water solution, and having an initial viscosity, as measured on a Brookfield viscosimeter, as high as about 8000 to 10,000 centipoises, preferably between about 7000 centipoises and about 3000 centipoises.

A preferred method is set forth in the following example.

*Example 1*

An original mixture of:

|  | Percent Dry | Percent by Weight of Total Mix |
|---|---|---|
| Cane Sugar (99.57% total solids) | 39.680 | 39.850 |
| Vegetable Fat (coconut oil 76° F. mm.) | 7.992 | 7.992 |
| Milk Solids Not Fat (99% total solids) | 20.880 | 20.580 |
| Lecithin (as emulsifier) | .0473 | .0473 |
| Water |  | 31.530 |
|  | 31.90 |  |
|  | 99.9993 | 100.000 | is prepared by introducing the water at about prevailing room temperature into a round 30 inch diameter pasteurizing vat provided with a suitable agitator and then adding the milk solids and dispersing the same in the water. There was added, after heating of this dispersion to about 100° F. the vegetable fat containing the lecithin dissolved therein. The mixture was then heated to about 120° F. and the granulated cane sugar was added. At about 120° F. the mixture was homogenized at 1000 p.s.i.g. through a "single service" wire cone valve. The homogenized product was sterilized by heating to about 190° F. and holding it at about 190° F. for 10 minutes in a covered vat and flash-cooled in a vacuum pan to about 90° F. Sterilized alpha lactose hydrate in the form of 3 micron crystals was seeded into the finished product in amount of about .045% of the finished product by weight, while the product was at about 90° F. Thereafter, the product was cooled down to about 70° F. in a vacuum pan and aseptically canned as described in the U.S. patent to Martin, 2,549,216.

The finished product contained:

| | Percent |
|---|---|
| Cane sugar | 42 |
| Milk solids not fat | 21.5 |
| Fat (including the lecithin) | 8.5 |
| Water | 28 | or about 72% total solids content and the sugar-water solution present has a concentration of about 60%.

*Example 1a*

|  | Percent dry weight of total mix |
|---|---|
| Anhydrous butter fat (animal fat) (butter oil) | 8.60 |
| Milk solids not fat (99% total solids) | 21.35 |
| Cane sugar (99.57% total solids) | 39.90 |
| Water | 30.15 |
|  | 100.00 |

FINAL PRODUCT

|  | Percent |
|---|---|
| Butter fat | 9 |
| Milk solids not fat | 22 |
| Sugar | 42 |
| Water | 27 |
| Total solids | 73 |

This example was conducted in the same manner as Example 1. It will be noted that no independent emulsifier such as lecithin is present, as recited in Example 1.

The amount of water in the original mixtures of Examples 1 and 1a is always adjusted so that the resulting processing removes water to result in approximately 72–73% total solids.

In the foregoing examples, the initial temperature of the water may be about 40° F. to 100° F. but preferably is about room temperature, i.e., about 70° F., as described. The temperature of the milk solids-water dispersion is about 80° F. to 140° F. when the vegetable fat and sugar are added, as in Example 1, and about 100° F. to 140° F. when the butter oil and sugar are added, as in Example 2, preferably being at least about 100° F. when the fat and the sugar are added in each instance. The product at this point will preferably have a temperature of about 120° F., as described.

The mixture may be homogenized at as low as about 80° F. for a vegetable fat mixture and as low as about 100° F. for a butter fat mixture, and at a temperature up to about 140° F. for either product. Preferably, the homogenizing temperature for either mixture is at about 120° F., at a pressure of 500 to 1500 p.s.i.g. with the "single service" wire valve, preferably 1000 p.s.i.g. and between 1500 to 2500 p.s.i.g. with a "Gaulin" valve, preferably 1800 p.s.i.g.

Sterilizing may be carried out without objectionably increasing viscosity at 180° F. to 200° F. for 8 to 20 minutes, preferably at 190° F. for 10 minutes, or 185° F. for 20 minutes.

The mixture at the sterilizing temperature is flash-cooled in the vacuum pan, resulting in removal of moisture and cooling to about 70° F. so as to produce a finished product having about 72–73% total solids which is preferable and about 60–61% sugar-water solution.

Flash cooling over a greater range, e.g., from 180° F. to 60° F., 200° F. to 70° F., or 200° F. to 60° F., removes more moisture, resulting in a higher solids content in the finished product. Flash cooling within a narrow range does not remove as much moisture, resulting in lower total solids content in the finished product. Preferably, flash cooling is employed to cool the product from about 190° F. to 70° F., and remove moisture which gives a desirable finished product having about 72–73% total solids.

At about 76° F. to 110° F. seeding with sterile lactose is employed, preferably at about 90° F. The sterile alpha lactose mono-hydrate is about a 300 mesh grind (i.e., will pass through a sieve having 300 openings to the square inch), and the size of the crystals may range from 3 to 5 microns, preferably 4 microns. The amount of lactose added is about .4 pound of lactose per about 1000 pounds of finished product. Addition of a substantially greater amount of lactose has no additional beneficial effect.

After this seeding the product is further cooled to about 68° F. to 70° F. in a vacuum pan, preferably to about 70° F.

The filling and canning are under aseptic conditions and conventional, e.g., in accordance with the Martin patent, or in any other manner under conditions which will be free of yeast and mold contaminations.

In some cases, milk protein will develop viscosity on heating, dependent on its temperature treatment history as a fresh milk to form the powdered skim milk or milk solids not fat. Temperatures from about 160° F. to 190° F. in the manufacture of skim milk powders sometimes cause the same to develop high viscosity when made into a sweetened condensed product of this invention. To overcome this high-heat treatment protein (which is not true of low temperature heated milk powders), when it occurs, sodium citrate or sodium phosphate, e.g., disodium phosphate in small amount of about .002% to 0.1%, preferably 0.05%, based on the weight of the original mixture, is added to the milk solids not fat during the recombining operation, preferably at the time when the milk solids are initially dispersed in the water, as described above. If the milk powder is one which, by testing, bodies up on heating at a sterilizing temperature of about 190° F. for 15 minutes, then the adjusting salt, e.g., sodium citrate or the sodium phosphate, is added as just described. Sodium phosphate, e.g., disodium acid phosphate, in the amount above recited for the citrate, may be used as explained, but the sodium citrate is preferred.

The products of this invention initially have a viscosity between about 2000 and 18,000 centipoises at about 77° F. or room temperature, preferably between about 2000 and 5000 centipoises in the case of Example 1, and as high as i.e., up to about 18,000 centipoises in the case of Example 1a.

Sometimes, to obtain desired viscosity in the finished product with low heat skim milk powder and to prevent producing a too low viscosity in the finished product, the same is homogenized at higher pressures (those that result in body development), i.e., homogenized at about 700 to 2800 p.s.i.g. in a "single service" wire cone valve, and at a temperature of about 125° F. Thereafter, the homogenized mixture is processed using the subsequent steps as described in Example 1, following the forming of the reconstituted skim milk-water dispersion.

*Example 2*

In this example the same round 30 inch diameter pasteurizing vat with a 1½ inch valve for recombining and sterilizing was used. The vat was provided with a scraper blade for agitation to prevent burn-on, particularly in the case of high viscosity products. We find recombining is best conducted with agitation in the vat. The canning was done with a Martin aseptic canner, as described in the aforesaid patent, and under an atmosphere of superheated steam and with a conventional steam head closing machine, which resulted in a temperature increase of about 8° F. at a canning speed of about 20 cans per minute.

In preparing the product the ingredients were in the same amount as in Example 1 except no lecithin was used because the fat employed was butterfat. We found an acceptable order of addition to be as described above, namely, water was introduced to the vat in amount so that the total solids prior to processing is approximately 68.10% (5.79 pounds extra water per 100 pounds of final product having 72% total solids was used). The addition of milk solids not fat was made to the water having a temperature of about 60° F. and when these milk solids were dispersed free of lumps by the agitation, the mixture was heated to 100° F. and the butterfat was then added. This mixture was heated to 120° F. and the cane sugar was added.

The mixture was then homogenized at 1000 p.s.i.g. through a "single service" wire mesh cone, and the product sterilized by heating to 190° F. and holding for 10 minutes. The product was then flash-cooled in a vacuum pan to 90° F. and as the product cooled, the sterile lactose was added while the product was at 90° F.

The product was cooled to about 70° F. in a vacuum pan and canned in the Martin apparatus above described.

In another example the homogenization took place at 800 p.s.i.g. in the homogenizer, and in a further example, the homogenization took place at 1200 p.s.i.g. in similar equipment.

In an additional example, using high heat powder milk solids not fat, which was found to increase greatly in viscosity at the sterilizing temperature of 190° F. for 10 minutes, sodium citrate was added in the amount of .025% by weight of the finished product, the same being added to the water in the vat before the milk solids not fat were introduced.

While the temperature of the water in the foregoing examples was preferably about 60° F. in additional examples we used temperatures of about 90° F. to 45° F. for recombining. It was found that hydration without lumps occurred most favorably at room temperature, and in the examples which we followed, we preferably used temperatures of about 60° F., 65° F. and 70° F.

We observed in these various foregoing examples using vegetable fat and mixtures of vegetable and animal fat that the vegetable oil had a minor depressant effect on the foam, which foam was decreased by adding a small amount of lecithin to the fat before the same was added to the dispersion. That is, we found in the various examples of this invention, where the fat or oil inherently contained lecithin, as in the case of the milk fat, as in Examples 1a and 2, or the latter was added as in Example 1, that the foam depressant effect was proportional to the amount of present or added lecithin. After the aqueous dispersion of the milk solids not fat in the oil had been formed, the sugar was added and, as stated, all of the ingredients of the product were added in about the proportions set forth in Example 1.

We observed from the various examples that since it was most desirable to use all of the product moisture to hydrate the milk solids not fat, the preferred order of addition of ingredients to the process vat was (*a*) introduce all of the water, and salts, if they are added (*b*) milk solids not fat to the water at room temperature (60° F. to 70° F. water), (*c*) fat to depress the foam with the dispersion at about 100° F. to 110° F., and (*d*) sugar with the dispersion at 120° F. to 130° F. to achieve faster solubility.

The foregoing data was obtained by operating examples under the conditions and ranges recited.

In the canning operation in the foregoing examples, the cans and lids were sterilized and, as stated, the filling and sealing were accomplished so as to eliminate contamination. This was best obtained by using a Martin aseptic canner, according to our experience, but other equipment may be employed. Using the Martin equipment, the cans and lids were sterilized with superheated steam at 480° F. and the filling and closing was done under the same atmosphere. In some cases, a special long filling head was made. There was a mean temperature increase, as stated above, of about 8° F. occasioned from the filling and closing operation using the Martin equipment. The equipment was operated using a sterile air pressure adequate to obtain sufficient product flow so as to fill cans at 30 per minute, and depending upon the product viscosity, pressures up to 40 p.s.i.g. were used to fill the cans.

The seeding of the lactose was accomplished by "exploding" lactose-ladened air beneath the surface of the sweetened condensed milk previously cooled to about 90° F. We operated examples with the sweetened condensed milk cooled to temperatures varying from 76° F. to 110° F. successfully. In referring to sterile lactose, we mean lactose sterilized in closed cans at about 180° to 190° F. for 14–16 hours, and the crystals were placed in a hopper covered with a reinforced filter disc. By breaking the vacuum below the hopper, air was drawn through the filter disc and the lactose and into the vacuum pan below the product surface level. The air released into the vacuum with explosive force, scattering the lactose through the product.

The product was subjected to vigorous agitation continuously as the product was cooled in the vacuum pan, i.e., by flash cooling.

As stated above, lactose used for seeding was about 300 mesh and was Grind B alpha lactose monohydrate, as obtained in the open market. It was added at the rate of about .045% of the finished product by weight, as above described. Also, as explained in the foregoing examples, after the seeding operation step the product was cooled rapidly to about 70° F. in the vacuum pan before canning.

In preparing the products of this invention with standard circulation mixers, all of the water must be initially available to form the milk solids not fat dispersion, i.e., colloidal sol condition as the first step of preparation. The sugar is preferably added in dry granular form, i.e., as regular granulated cane sugar after the dispersion of hydrated milk solids has been produced. While the fat may be added before or simultaneously with or after the sugar, it is preferably added before the sugar, as we find this reduces foaming. If a portion of the amount of water of reconstitution were withheld to make a sugar syrup for subsequent addition to the dispersion, the milk solids not fat, because of insufficient water, would lump, ball and make the mass extremely viscous when using standard circulation mixers. This is highly objectionable because the finished product is not smooth. That is, the milk solids not fat do not hydrate adequately because there is insufficient free water available for their complete hydration and such water could not be drawn from the subsequently added sugar syrup. Therefore, we add the granulated sugar to the hydrated recombined milk solids not fat when they have been substantially completely hydrated.

If a high-speed, high-shear mixing blade is used to disperse the milk solids not fat in a homogenous colloidal dispersion, the product is made by using sugar syrup rather than granular sugar, and the use of additional water to facilitate the hydration of milk solids not fat becomes unnecessary. The mixing machine we have used and found to be best for rapid and uniform dispersion is the Morehouse-Cowles Dissolver. Use of this mixing blade alters the original mixture formula and subsequent processing. Although vat cooling and seeding of a 72–73% total solids mixture is possible, the vacuum flash cooling method is preferred because of its speed of cooling and uniformity of seeding.

*Example 3*

In this example, which was otherwise like Example 1, a sugar syrup was used, resulting in the same composition of the original mixture on a dry weight basis. In order to disperse the milk solids not fat in the water when using a sugar syrup as a source of sugar, a conventional high-speed, high-shear mixing machine was used, which dispersed the milk solids not fat in a homogenous aqueous colloidal dispersion free of the lumps and balling normally encountered with circulation mixers. One-fourth of the total sugar for the batch is added to the mixer as granulated or dry sugar. This mixture was homogenized at 1000 p.s.i.g. through a "single service" wire cone valve. Then the balance of the sugar as a 75° Brix sugar syrup at 180° F. was added to the water dispersion of milk solids not fat, and the sugar and vegetable fat or butter fat, as was the case, was added in accordance with the earlier samples.

*Example 4*

A mixture containing:

| | Percent |
|---|---|
| Cane sugar | 42 |
| Milk solids not fat | 21.5 |
| Fat (including lecithin) | 8.5 |
| Water | 28.0 | or about 72% total solids content and the sugar-water solution present having a concentration of about 60% was made by mixing the water and milk solids not fat at 90° F., heating to 120° F. and adding the sugar and fat and continuing mixing. The mixing was accomplished only by the use of the aforesaid high-speed, high-shear mixing blade. The product was then homogenized at 1000 p.s.i.g., vat-pasteurized at 190° F. for 10 minutes with scraper blade agitation, vat-cooled to 90° F., and seeded with a .045% lactose (by weight), then cooled to 70° F. and canned, all as described above.

In addition to the formulas mentioned above, the following products are of considerable value and include a chocolate flavor which is used to produce chocolate-flavored, recombined, sweetened, condensed milk.

*Example 5*

A finished product contains the following:

| | Percent |
|---|---|
| Cane or beet sugar | 42.00 |
| Milk solids not fat | 22.50 |
| Fat (butter fat, vegetable fat, or animal fat) | 5.60 |
| Flavor | 2.90 |
| Water | 27.00 |

*Example 6*

A finished product contains the following:

| | Percent |
|---|---|
| Sugar as above | 38.60 |
| Milk solids not fat | 20.60 |
| Fat as above | 3.14 |
| Water | 33.00 |
| Flavor | 2.65 |

The finished product in each case of Examples 5 and 6 is built up from a pre-mix containing approximately 67.0% total solids in the compositions recited.

The flavor referred to in Examples 5 and 6 consists of:

| | Percent |
|---|---|
| Blommer Company, Chippewa Dutch Cocoa | 1.65 |
| Wilber Company, 322 Duchess Cocoa | .41 |
| Ambrosia Company, Dutch AD Cocoa | .41 |
| Dihydro vanillin ("Vaniloin C," Florasynth Laboratories, Inc.) | .0156 |
| Sodium chloride | .096 |
| Malt | .089 |

One of the requirements of the cocoa used is fine particle size to reduce the chance of large lactose crystal size as the result of seeding by large particle cocoa. It is, therefore, required that the cocoa have a grind of the particle size not less than 300 mesh cocoa. While the particular cocoa mentioned imparted the desired flavor to the product, others than this particular cocoa may be used. It is the object to produce a flavored, recombined, sweetened, condensed milk of a desirable blend, e.g., of various blends of cocoa or other flavors, such as vanilla, strawberry, or some other marketable flavor.

In preparing Examples 5 and 6 the chocolate or blended flavor is introduced at any point in the process before the sterilization, and while the amount indicated is about 2.66%, this may vary from about 1% to 5%, according to the particular concentrated taste desired or the use for which the product is employed.

We have referred hereinabove to milk fat which is animal fat and coconut oil, which is vegetable fat, and it is to be understood that combinations or mixtures of these, as well as combinations or mixtures of other oils and fats may be used, such as peanut oil, cottonseed oil, soybean oil, sesame oil, palm oil, palm kernel oil, dehydrated butter-fat, and, in fact, any of the well-known edible vegetable fats, and the same may or may not be hydrogenated, and we prefer to use granulated cane sugar or beet sugar as the separately added polysaccharide constituent. About the same amount of fat or mixtures of fats are used as described in the examples, e.g., equal parts of animal and vegetable fat are used in the foregoing examples.

In using the lecithin as described herein, about .05% is preferably used, as set forth in Example 1. Not more than about .1% is used, and not less than about .04% is employed.

The viscosities mentioned hereinabove are at the time of manufacture of the product, i.e., the initial viscosity.

The product of this invention is smooth and free of sediment, i.e., there is no precipitation out of proteins or lactose, and there is no free fat separation. It is useful for coffee in place of cream or milk, for infant feeding, suitably diluted with water, for baking, and for making candy. Also, the product has many uses, such as are well-known for sweetened condensed milk.

This application is a continuation-in-part of our copending application Serial No. 39,216, filed June 28, 1960, now abandoned, and our abandoned applications Serial No. 746,327, filed July 3, 1958, and Serial No. 757,681, filed August 28, 1958.

We claim:

1. The process of preparing a sweetened condensed milk product from dry ingredients which comprises dispersing dry milk solids not fat in amount of 20.880% to 21.5% dry weight in water in amount of about 28% to 31.9% by weight having a temperature of about 40° F. to 100° F., heating the dispersion to a temperature of about 80° F. to 140° F. and adding an edible fat selected from the group consisting of vegetable fat in amount of about 7.99% to 8.5% by dry weight, animal fat and mixtures thereof, and cane sugar in amount of 39.680% to 42% by dry weight within that temperature range, finely dispersing the fat in the mixture having a temperature of about 80° F. to 140° F., sterilizing the mixture at a temperature between about 180° F. and 200° F. for about 10 to 20 minutes, cooling the mixture to about 90° F. to 110° F. and seeding the mixture with lactose crystals at a temperature of about 76° F. and 110° F., and cooling to about 70° F.

2. The process according to claim 1 wherein the dispersing of the fat in the mixture is accomplished by homogenizing it at a pressure of above about 500 p.s.i.g.

3. The process according to claim 1 wherein the dispersing of the fat in the mixture is accomplished with high shearing and mixing.

4. The process according to claim 1 wherein the mixture is flash-cooled to about 90° F. to 110° F.

5. The process according to claim 1 wherein the mixture is cooled by indirect cooling to about 90° F. to 110° F.

6. The process according to claim 1 wherein the seeded mixture is cooled by evaporative cooling to about 70° F.

7. The process according to claim 1 wherein the seeded mixture is cooled by indirect cooling to about 70° F.

8. The process according to claim 1 wherein the lactose-seeded product is cooled to about room temperature and thereafter filled and canned under aseptic conditions.

9. The process according to claim 1 wherein a salt is added to the milk solids not fat-water dispersion selected from the group consisting of edible alkali metal and alkali earth metal salts to control the viscosity of the final product.

10. The process according to claim 1 wherein about .04% to 1% lecithin is added to depress foaming of the product.

11. The process according to claim 1 wherein the polysaccharide is sugar and wherein one-fourth of the sugar added is dry and three-fourths of the sugar is in the form of sugar syrup.

12. The process according to claim 1 wherein the finally cooled product is aseptically filled and canned.

13. The process according to claim 1 wherein the water-milk solids not-fat dispersion is prepared with the water at room temperature, the edible fat is added at a temperature of about 110° F. of the dispersion, the sugar is added at a temperature of about 120° F. of the dispersion, the dispersion is homogenized at a temperature of about 120° F. at a pressure between about 500 and 2500 p.s.i.g., the mixture is sterilized at about 190° F. for 10 minutes and then flash-cooled in a vacuum pan to 100° F. and wherein at 100° F. sterile alpha lactose hydrate crystals having a particle size between about 3 and 5 microns are added at a rate of about .045% by weight of the finished product and wherein the product is then cooled to about 68° F. to 70° F. and thereafter aseptically filled and canned.

14. The process of claim 1 wherein the hydrated milk solids not-fat dispersion is formed before the addition of the sugar.

15. A process according to claim 1 in which the sugar is selected from the group consisting of cane sugar and beet sugar.

16. A product according to claim 1 wherein sugar-water solution is present in about 60% concentration in the final product.

17. The process of preparing a sweetened condensed milk product which comprises dispersing the milk solids not fat in cane sugar solution with a high-speed and high-shear mixing at about 70° F. to 100° F., heating the dispersion to a temperature of about 80° F. to 140° F. and adding vegetable fat and polysaccharide within that temperature range, homogenizing the mixture having a temperature of about 80° F. to 140° F. at a pressure above about 500 p.s.i.g., sterilizing the homogenized mixture at a temperature between about 180° F. and 190° F. for about 10 to 12 minutes, flash-cooling the mixture to about 90° F. to 110° F., and seeding the mixture with lactose crystals at a temperature between about 100° F. and 110° F., and evaporative cooling to about 70° F.

18. The process according to claim 17 wherein the mixture is cooled to 90° F. with agitation, seeded with .0475% alpha lactose hydrate (of about 3 micron particle size), at a temperature between about 76° F. and 110° F., vat cooled to about 70° F. and canned 19. A process according to claim 1 in which a chocolate flavor is incorporated in the mixture prior to sterilization.

References Cited in the file of this patent

UNITED STATES PATENTS

| | | |
|---|---|---|
| 1,302,486 | Dunham | April 29, 1919 |
| 2,565,085 | Peebles | Aug. 21, 1951 |

OTHER REFERENCES

U.S. Agriculture Report 84, 1955, pages 14–17.